US008509077B2

United States Patent
Naven et al.

(10) Patent No.: US 8,509,077 B2
(45) Date of Patent: *Aug. 13, 2013

(54) METHOD FOR CONGESTION MANAGEMENT OF A NETWORK, A SWITCH, AND A NETWORK

(75) Inventors: Finbar Naven, Cheadle Hulme (GB); Ian David Johnson, Ferring (GB); Jose Duato, Valencia (ES); Jose Flich, Nules Castellon (ES)

(73) Assignee: Xyratex Technology Limited, Havant (GB)

( * ) Notice: Subject to any disclaimer, the term of this patent is extended or adjusted under 35 U.S.C. 154(b) by 386 days.

This patent is subject to a terminal disclaimer.

(21) Appl. No.: 12/295,969

(22) PCT Filed: Mar. 22, 2007

(86) PCT No.: PCT/GB2007/001035
§ 371 (c)(1),
(2), (4) Date: Nov. 26, 2008

(87) PCT Pub. No.: WO2007/113474
PCT Pub. Date: Oct. 11, 2007

(65) Prior Publication Data
US 2009/0092046 A1    Apr. 9, 2009

Related U.S. Application Data

(60) Provisional application No. 60/789,157, filed on Apr. 5, 2006.

(51) Int. Cl.
*H04L 12/26* (2006.01)
(52) U.S. Cl.
USPC ............................................. 370/235

(58) Field of Classification Search
None
See application file for complete search history.

(56) References Cited

U.S. PATENT DOCUMENTS

| 5,629,928 A | * | 5/1997 | Calvignac et al. ............ 370/237 |
| 5,787,071 A | | 7/1998 | Basso |

(Continued)

FOREIGN PATENT DOCUMENTS

| EP | 712 220 | 5/1996 |
| WO | 2005/086435 | 9/2005 |

OTHER PUBLICATIONS

H. Jonathan Chao, "A General Architecture for Link-Layer Congestion Control in ATM Networks", International Switching Symposium 1992, vol. 1, Dec. 14, 2009, pp. 239-233.

(Continued)

*Primary Examiner* — Chi Pham
*Assistant Examiner* — Mohammad Adhami
(74) *Attorney, Agent, or Firm* — Pillsbury Winthrop Shaw Pittman LLP

(57) ABSTRACT

A switch for connection in a network of other like switches and includes memory for storing data packets, a control system arranged to control the switch to, upon receipt at one of the ingress or egress ports of notification of congestion at a downstream congested port, either store at said ingress port or egress port data packets received for said congested port or to communicate with an upstream port for storage at said upstream port of data packets destined for the congested port, and in dependence on the current of stored data, to send a message to a further upstream port informing the further upstream port of the congestion downstream. The memory is provided substantially only at the ingress ports or the egress ports of the switch.

20 Claims, 3 Drawing Sheets

(56) References Cited

U.S. PATENT DOCUMENTS 6,657,963 B1* 12/2003 Paquette et al. ............... 370/236
2008/0253289 A1* 10/2008 Naven et al. .................. 370/236

OTHER PUBLICATIONS

International Search Report published with PCT/GB2007/001035, Jun. 13, 2007, 3 pages.

* cited by examiner

METHOD FOR CONGESTION MANAGEMENT OF A NETWORK, A SWITCH, AND A NETWORK

CROSS REFERENCE TO RELATED APPLICATIONS

This is the U.S. National Phase of PCT/GB2007/001035, filed Mar. 22, 2007, which in turn claims priority to U.S. provisional application Ser. No. 60/789,157, filed Apr. 5, 2006, the entire contents of both of which are incorporated herein by reference.

In our co-pending international patent application no. PCT/GB2005/000836 (having publication no. WO-A-2005/086435), there is disclosed a method for congestion management of a network in which a switch or a network of connected switches is provided, each of the switches having a plurality of ingress ports and a plurality of egress ports. As explained in WO-A-2005/086435, contention and congestion within a network can occur when several data flows across a network contend for access to the same egress or ingress port of a switch within the network. If the bandwidth provided by the egress port is not high enough to service all requests made of it, then the contention for the egress port between data traffic flows becomes congestion. Data packets that cannot make forward progress are buffered in queues either at an ingress port or an egress port, depending on where the congestion occurs.

Congestion can propagate through a network usually starting at a particular port and spreading backwards into the network. A congestion tree is thus established having a root at the port where congestion was first identified. A congested port along the congestion tree may sometimes be referred to as a "leaf" of the congestion tree.

Head of line blocking can occur in switch networks, wherever a queue stores data packets for different destinations and the packet at the head of the queue is prevented from being forwarded because its destination is unable to accept the packet. This is usually a consequence of several flows contending for access to the same egress port of a switch within the network.

The method for congestion management disclosed in WO-A-2005/086435 provides a system within which regional explicit congestion notification messages are transmitted between switches and ingress and egress ports on the network in such a way as to minimise head of line blocking. That is to say the system described in WO-A-2005/086435 relates to a method of congestion management in a network in which messages are sent between switches relating to congestion at ports other than the port from which the message was sent. Such congestion management methodologies are referred to herein as "regional congestion management methodologies" and are said to rely on "Regional Explicit Congestion Notification", (RECN).

Although the method and apparatus disclosed in WO-A-2005/086435 works well, there is a desire to decrease the complexity and cost associated with building a switch for use in a network and for reducing the complexity of the method of operation of the congestion management method.

As data rates of network links increase there is a need for the corresponding memory requirements of switches to increase. This is due to the fact that in any given time period, the volume of data being processed by a switch in a network is related to the bandwidths of the links between the ports of the switch and ports of other connected switches. As data rates increase, one way to deal with this problem would be simply to increase the size of the memory or memories in the switches. However, this can add significantly to the cost and complexity of the switch.

The entire content of WO-A-2005/086435 is incorporated herein by reference. The apparatus and method of the present invention is directly applicable to a method and apparatus as disclosed in WO-A-2005/086435. In other words, the invention has specific application in the technical field of congestion management wherein a regional explicit congestion notification protocol is used. Of course, the present method and apparatus may also be used in congestion management systems that utilise local explicit congestion notification (LECN) protocols.

According to a first aspect of the present invention there is provided a switch, comprising: a plurality of ingress ports and a plurality of egress ports, the switch being for connection in a network of other like switches; memory for storing data packets; a control system arranged to control the switch to, upon receipt at one of the ingress or egress ports of notification of congestion at a downstream congested port, either store at said ingress port or egress port data packets received for said congested port or to communicate with an upstream port for storage at said upstream port of data packets destined for the congested port, and in dependence on the current of stored data, to send a message to a further upstream port informing the further upstream port of the congestion downstream; wherein the memory is provided substantially only at the ingress ports or the egress ports of the switch.

According to a second aspect of the present invention there is provided a method of congestion management in a network of switches each switch having plural ingress ports and plural egress ports, the method comprising: at a switch, upon receipt at one of the ingress or egress ports of the said switch of notification of downstream congestion, either storing at said ingress port or egress port data packets received for said congested port or communicating with an upstream ingress or egress port requesting storage at said upstream ingress or egress port of data packets destined for the congested port and independence on the amount of data stored, sending to a further upstream port notification of the congestion downstream; wherein the storage of data packets is done in memory provided substantially only at the ingress ports or the egress ports within a switch.

The present invention provides a method and apparatus in which head of line blocking in a network of interconnected switches may be avoided or minimised whilst still ensuring that the complexity and cost of the component switches in the network is minimised. In particular, by providing a switch in which buffering for data packets destined for congested ports or otherwise is provided substantially only at the ingress or egress ports, the memory requirement within the switch can be significantly reduced. Over an entire network of switches, the saving both in cost and the complexity of the operation of the network is significant.

In an embodiment of the invention, the method of congestion management is executed by inclusion of communication between ingress and egress ports within a switch. The provision of memory for data packets substantially only at the ingress or egress ports enables the memory requirements of the switch to be reduce. Functionality may be mentioned by communication between ports of status messages together with information relating to what data packets may or may not be stored at a particular port.

In one particular embodiment, the invention provides, a switch comprising a plurality of ingress ports and a plurality of egress ports, the switch being for connection in a network of other like switches, the switch being arranged upon receipt at one of the ingress or egress ports of notification of downstream congestion either to store at said egress port data packets received for said congested port or communicating with an upstream ingress port for storage at said upstream ingress port of data packets destined for the congested port, there being storage provided substantially only at one of the ingress and egress port, thereby ensuring minimal memory requirements in the switch.

Preferably, upon request a set-aside queue may be established at the ingress or egress port of a switch for the storage of data packets destined for a downstream congested port.

According to a third aspect of the present invention, there is provided a method of de-allocating a set-aside queue in a switch according to the first aspect of the present invention in which at least one set-aside queue has been established, the method comprising, when certain criteria are met, de-allocating the set-aside queue independently of the status of set-aside queues anywhere else on the network.

According to a fourth aspect of the present invention, there is provided a network of interconnected switches at least some of the switches having plural ingress ports and plural egress ports, the switches being connected in such a manner to enable routing of data packets from one location on the network to another location on the network, wherein at least one of the switches having plural ingress and plural egress ports is a switch according to the first aspect of the present invention.

According to a further aspect of the present invention, there is provided an end station for use in a network of switches according to the fourth aspect of the present invention, the end station having plural ingress and egress ports and a control system for providing corresponding functionality to that of the other switches in the network including the at least one switch according to the first aspect of the present invention.

Examples of the present invention will now be described in detail with reference to the accompanying drawings, in which.

Figure 1:
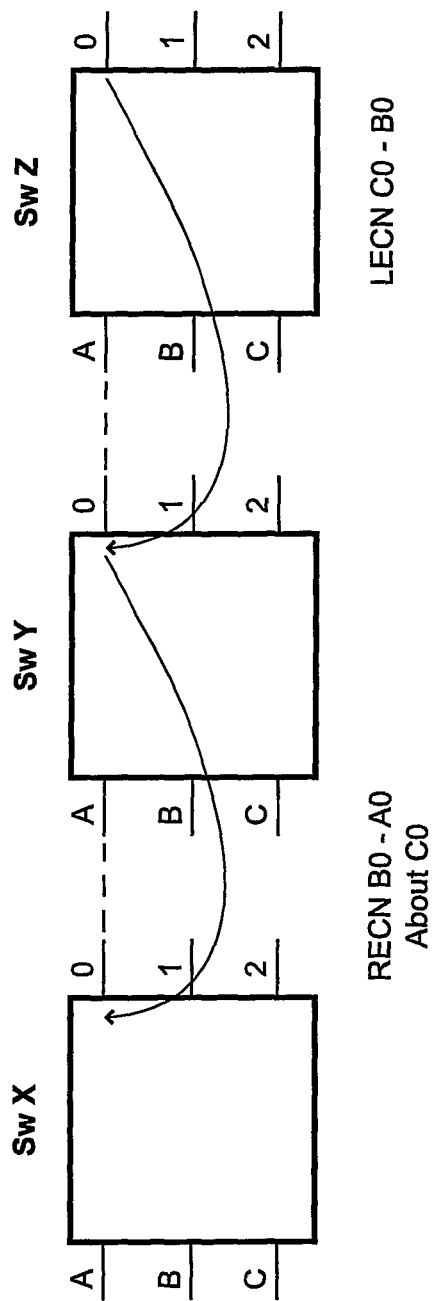
FIG. 1 shows a schematic representation of an example of a network of switches according to an embodiment of the present invention.

FIG. 1 shows a schematic representation of an example of a network of switches according to an embodiment of the present invention. A regional explicit congestion notification (RECN) protocol is used in addition to a local explicit congestion notification (LECN) protocol to manage congestion that may occur within the network of switches. In the example shown, the network comprises three switches, switch X, switch Y and switch Z. Each of the switches X, Y and Z has three ingress ports A to C and three egress ports 0 to 2.

In a local explicit congestion notification (LECN) protocol, communications sent between ports relating to congestion in the network, relate to congestion only at one of the ports involved in the communication. This contrasts with a RECN protocol in which communications between ports may relate to congestion at a port further downstream than either of the ports involved in the communication.

At an end station or switch, e.g. switch X, that is injecting traffic into a switch or network of switches and in an individual switch element a pool of dynamically allocated associatively mapped set-aside queues (SAQs) are provided. As will be explained in greater detail below, in each of the switches, the SAQs are provided only at either the ingress ports or the egress ports. Similar functionality to the switches described in WO-A-2005/86435 can be achieved, whilst the hardware requirement and complexity of each of the switches is significantly reduced.

Within each of the switches X, Y and Z the SAQs are operable in a manner responsive to a regional explicit congestion notification (RECN) protocol. The RECN signalling protocol operates between and through the switches out to the end stations of the network to manage the allocation, population and de-allocation of the SAQs by flows which are congested.

In the example shown in FIG. 1, initially congestion is detected at the egress port 0 of switch Z. A notification of this congestion is sent to the egress port 0 of switch Y. Of course, the communication will go initially to the ingress port A of switch Y and from there to the egress port 0 of switch Y. This communication across a single hop of a network of interconnected switches makes use of conventional and well known flow control methodologies.

Using the apparatus and method disclosed in WO-A-2005/86435, when packets that will pass through egress port 0 at switch X reach egress port 0 of switch Y, congestion is detected, a RECN notification is sent to an upstream port informating the upstream port of the congestion at the port 0 of switch Z. Thus, the RECN communication includes details of the congestion downstream at the original point of congestion, i.e. port 0 of switch Z. Thus, data packets now destined for port 0 of switch Z that are at the egress port 0 of switch X, are stored in a new set-aside queue at the egress port 0 of switch X. Thus, head of line blocking at the ingress and egress ports of switches X and Y is removed.

Previously, the network of switches was considered to be a network of ingress and egress ports, whereby buffering was provided at each of the ingress and egress ports for storing data packets destined both for ultimately congested port and uncongested ports. In embodiments of the present invention, the memory and buffering resource requirements are effectively halved whilst the original functionality is preserved. Thus, the cost and complexity of each individual switch may be reduced whilst still being capable of providing the RECN functionality.

In one embodiment, buffering is provided substantially only at the ingress ports of individual switches. In another example, buffering may be provided substantially only at the egress ports of an individual switch. In this case some buffering is still required at the ingress ports, but significantly less than that provided at the egress ports. It is preferred that buffering is provided only at the ingress ports. Such a configuration may be referred to as a "no-egress-buffer switch".

In a no-egress-buffer switch described herein, it will be appreciated that in practice a small amount of memory may be provided at the egress ports but this amount of memory is extremely small and is provided only to enable the switch to function in some embodiments. In all cases a significant majority of the memory in the switch for data packet queues is provided only at the ingress ports or only at the egress ports.

Figure 2:
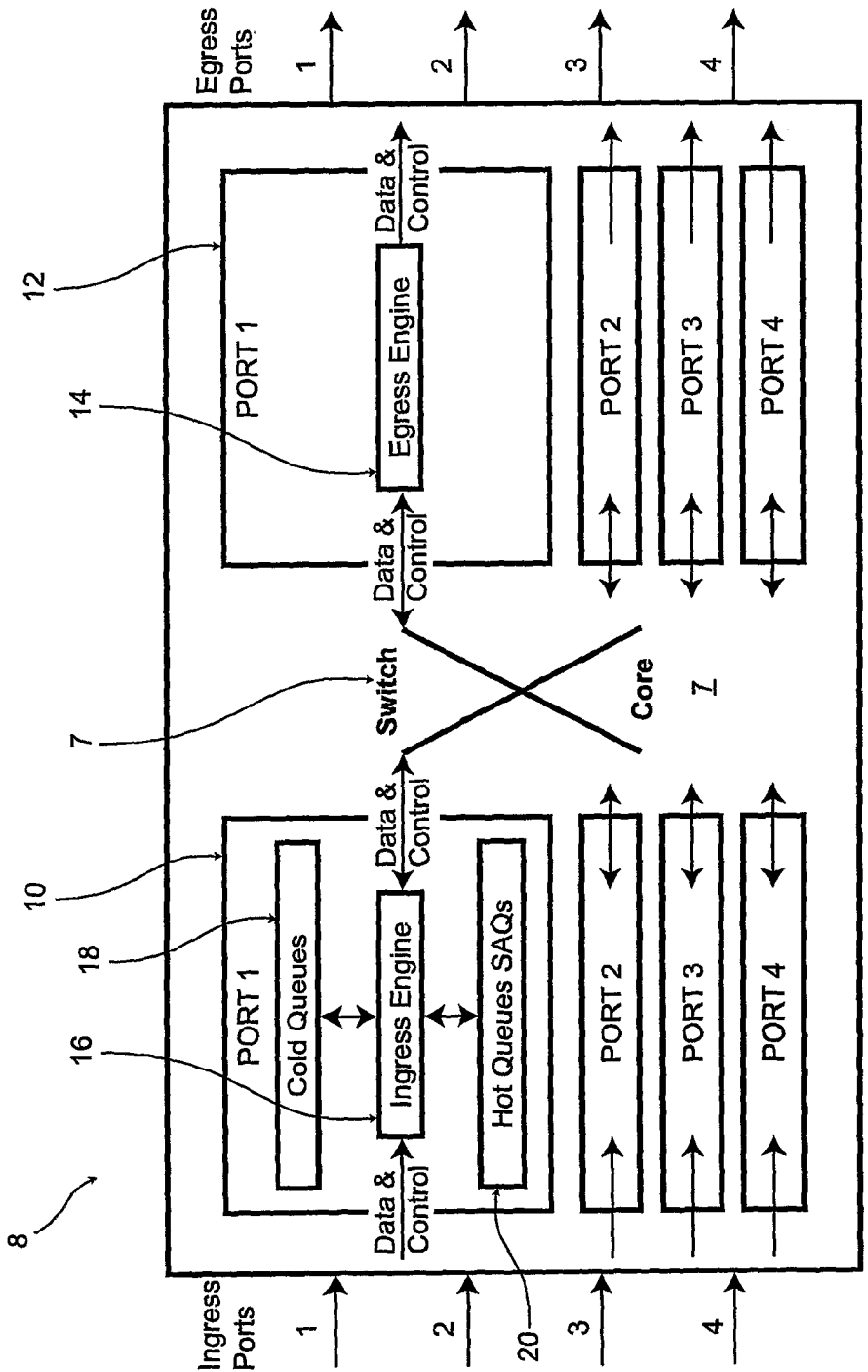
FIG. 2 is a schematic representation of an example of a switch according to an embodiment of the present invention.

FIG. 2 shows a schematic representation of an example of a switch according to an embodiment of the present invention. In the example shown in FIG. 2, the switch may be of a type suitable for connecting within a network as shown in FIG. 1. In such switches some processing capability is usually provided for controlling operation of the switch. Typically, this may include an integrated microprocessor or some other such device programmed or configured to have the desired functionality.

The switch 8 has a plurality of ingress ports 10 and a plurality of egress ports 12 connected across a switch core or fabric 7. In the example shown, there are four ingress ports and four egress ports although in practice, any number of ingress and egress ports could be provided. Only the first ingress port 10 and egress port 12 are shown in detail, but it will be appreciated that the others (ingress and egress ports 2 to 4) are the same.

The egress port 12 has an egress engine 14 forming or being formed by part of the control system of the switch 8. The ingress port 10 has an ingress engine 16 also forming or formed by part of the control system of the switch 8. Within each ingress port 10, cold queues 18 and set-aside queues 20 are provided. The function of the cold queues 18 and the set-aside queues 20 will be described in greater detail below. However, the cold queues are for storing data packets for onward transmission through uncongested locations, whereas the set-aside queues 20, sometimes referred to as "hot queues", are for storing data packets passing through or destined for congested downstream locations.

The egress port 12 has no memory for the establishment of set-aside queues or cold queues. In contrast to the ingress port 10, there is no memory provided for the establishment of cold queues or set-aside queues. Rather, the egress engine 14 merely functions to control the onward transmission of received data packets from an ingress port 10, without storing the data packets in any particular queue.

In contrast to known switches for implementing a RECN protocol, the switch 8 shown in FIG. 2 has substantially no memory for the storage of data packets at the egress ports 12. In other words, the memory of the switch for data packets passing through the switch is provided only at the ingress ports 10. This is a particular example of a low-memory switch in which memory for data packets is provided only at the ingress ports or only at the egress ports, but not at both the ingress ports and the egress ports. Thus, the memory requirements for such a switch are significantly reduced and in some cases substantially halved in comparison to a switch as disclosed in WO-A-2005/086435, whilst substantially identical functionality is achieved.

Figure 3:
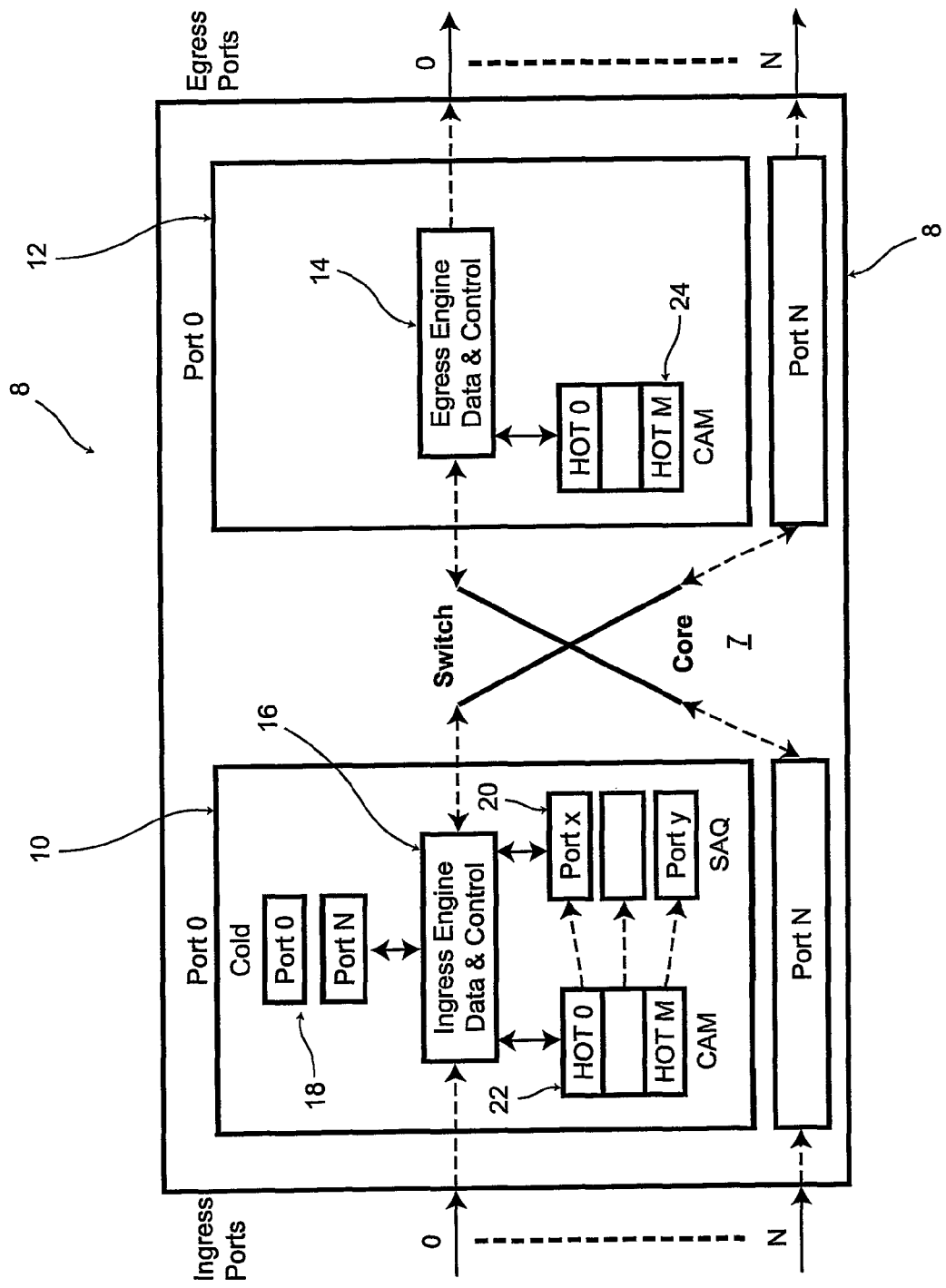
FIG. 3 is a schematic representation of a second example of a switch according to an embodiment of the present invention.

FIG. 3 shows a more detailed schematic representation of the switch of FIG. 2. Instead of being shown with four ingress ports and four egress ports, the switch is shown as having N ingress and N egress ports. It will be appreciated that any suitable number of ports may be provided in the switch.

Referring first to the ingress port 10 shown in FIG. 3, the ingress port comprises an ingress engine 16 together with memory for establishment of cold queues 18, set-aside queues 20 and associative memory 22. In this case, the associative memory 22 is a content addressable memory (CAM). A CAM is a particularly desirable type of associative memory for use in the switch 8 due to the speed with which its contents can be accessed for checking.

The ingress engine 16 is arranged in communication with each of the cold queues 18, the CAMs 22 and the set-aside queues 20. The operation of the ingress engine and the ingress port 10 will be described in more detail below. Referring now to the egress port 12, an egress engine 14 is provided in communication with CAMs 24. The ingress ports and the egress ports 12 are able to communicate via the switch core 7.

In use, the switch 8 will typically be connected in a network to other like switches both upstream and downstream of the switch 8. Data packets are sent from the egress ports of an upstream switch to the ingress ports 10 of the switch 8. Next, the data packets are switched through the switch core by a controller (not shown) Subsequently, data packets are then sent onwards from the egress ports 12 of the switch 8 to the ingress ports of a downstream switch to which switch 8 shown in FIG. 2 is connected.

As is well known, there are generally two methods by which data packets may be routed within a network of switches. These are direct network addressing methods and deterministic source routing, also known as turnpool routing. In direct network addressing methods, at its origin, a data packet is informed of its eventual destination. As the data packet is received by switches en route to its destination, a look up table in the switch is referenced and from this look up table the appropriate egress port by which the data packet should leave to continue its route to the destination is determined.

In contrast, in deterministic source routing, at its outset a binary instruction is given to a data packet, the instruction containing an entire route for the packet from its origin to its destination. In embodiments of the present invention, deterministic source routing or the use of turnpools is preferred due to the increased speed at which it is possible to perform routing operations.

A turnpool consists of a set of contiguous variable sized fields in a packet header, and a pointer. The pointer is initialised by the source endpoint, and addresses the first valid field in the turnpool, which specifies the address of an egress port in the first downstream switch, relative to the ingress port. The size of the field is sufficient to enable the above addressing operation for all ports in the switch. As a packet traverses the network fabric, i.e. moves through the network of connected switches, the pointer is altered in each switch to address the next field in the turnpool, which will be the port addresses of the next downstream switch. There should be no remaining fields in the turnpool when the packet reaches the appropriate endpoint.

A mask size mechanism referred to in CAM addressing operations provides a means of limiting the size (or range) of the turnpool fields used to address the CAM, and/or a means of identifying the size (or range) of the fields in the stored data. A network fabric can consist of a series of connected switches that are smaller than the maximum size allowed by the turnpool size (which is limited to 31 bits). Alternatively, congestion can appear anywhere within the network. Therefore only the fields within the turnpool required to address the switches along the congestion tree are pertinent to the CAM operations, and these must be determined at each CAM. It will be appreciated that the use of turnpools and bit masks merely provides one possible means by which deterministic source routing within the network can be achieved.

The cold queues are for storing data packets destined for uncongested downstream ports. Whenever the number of data packets in a cold queue 18 at ingress port 10 reaches a certain detection threshold, a new set-aside queue 20 is allocated at the ingress port and a corresponding CAM entry is generated, e.g. including a turnpool and bitmask corresponding to the location of the congested port i.e. the output port requested by data packets stored in the cold queue. A data packet subsequently received at the ingress port has its turnpool and bitmask read and checked against entries in the CAM. In fact, as will be explained below it is preferred that "post-processing" is utilised in which data packets are first received in a cold queue and from there transferred to a set-aside queue if required.

Where post-processing is not utilised, upon arrival of a data packet, if there is a match between the turnpool and bitmask of the packet with any of the CAM entries at the ingress port, the data packet is routed to the set-aside queue. If there is no match, the data packet is mapped into the corresponding cold queue in the normal way. When an upper threshold level is reached in the set-aside queue, i.e. the amount of data or number of data packets exceeds some defined limit, a message is sent upstream to the egress port of a connected switch to inform the upstream egress port of the downstream congestion that led to the establishment of the set-aside queue at the ingress port 10.

According to the system described in WO-A-2005/086435, where memory for set-aside queues was provided at the egress ports 12, a set-aside queue may then be established for storage of subsequently received data packets destined for the downstream congested port.

When a threshold level was reached in the set-aside queue at the egress port, an internal flow control notification was sent to all the ingress ports of the switch, informing all the ingress ports of the "full" nature of the set-aside queue at the egress port. Each ingress port checks the notification against all of its CAM lines. In the case of a match, it sets an Xoff bit, so that no data packets from the corresponding set-aside queue are sent on to the congested egress port. Otherwise, a new set-aside queue is allocated at the ingress port corresponding to the egress port that sent the congestion notification.

Similarly, wherever a set-aside queue at an ingress port reaches a detection threshold an external flow control notification is sent to the upstream switch. Again, the egress port of the upstream switch checks the notification against all of its CAM lines. If there is a match, it sets the corresponding Xoff bit. Otherwise, it allocates a new set-aside queue and sets the corresponding information in its CAM. Thus, congestion propagates through the network and a congestion tree is established having a root at the port where congestion was first identified. However, the problem of head of line blocking is substantially avoided.

However, in contrast to this arrangement, in the example of a switch shown in FIG. 3 (if post-processing is utilised) at the ingress port, whenever a packet reaches an ingress port, the packet is stored in the corresponding cold queue 18. When the packet reaches the head of the cold queue, the turnpool of the packet is matched against all the entries in the CAM at the ingress port. If there is a match, the shortest match is selected and the packet is mapped to the corresponding set-aside queue. Otherwise, the packet is sent to the switch scheduler (not shown). Whenever a packet reaches the head of a set-aside queue, the turnpool of the packet is matched against all the turnpools and bit masks of the corresponding ingress port CAM. If there is a match, the shortest matching (but longer than the current one) is selected and the packet is mapped to the new existing corresponding set-aside queue. Otherwise, the packet is sent to the scheduler.

In a preferred embodiment, a post-processing methodology is utilised in that all data packets are initially routed to a cold queue and only when they have reached the head of the cold queue are they checked for possible routing to a set-aside queue.

The operation of the egress port 12 is significantly different, as substantially no memory is provided for the establishment of cold queues and set-aside queues. Indeed, at the egress port 12, when a packet reaches the egress port 12 from a corresponding ingress port, the packet is merely sent onwards to the link when scheduled for transmission. As mentioned above, substantially no memory is provided at the egress port for the establishment of set-aside queues or cold queues, but in practice a small memory will be provided merely to enable the switch to operate when the data rate internal to the switch is different from the external link data rate.

Congestion propagation within a network of switches such as that shown in FIG. 3, is as follows. Whenever a set-aside queue at an ingress port 10 reaches a certain threshold, the Xoff threshold, it sends a flow control notification to an upstream switch to which it is connected. The notification contains a turnpool and bit mask of the associated CAM line. The upstream switch, at the egress port connected to the corresponding ingress port, matches the turnpool and bit mask against all of its CAM lines. If there is a match, it sets its Xoff bit, i.e. a bit specifically assigned for identifying whether or not transmission from (in this case) the egress port is allowed. Otherwise, a new CAM line is allocated at the egress port.

Whenever an egress port 12 receives a packet, the turnpool and bit mask of the packet is matched against all of the CAM lines at the egress port. If there is a match, the Xoff bit is inspected. If the bit is set, then an internal Xoff flow control notification is sent to the ingress port that sent the packet. The notification includes the turnpool and the bit mask of the CAM line. Upon receipt of the notification at the ingress port, the ingress port matches the turnpool and bit mask provided against its CAM lines. If there is a match, the corresponding Xoff bit is set at the ingress port. Otherwise, a new set-aside queue is allocated in the ingress port and a corresponding CAM line is allocated.

In other words, the Xoff flow control notification is used for serving more than one purpose. Not only is it used for the transmission of flow control notifications, but it may also be used to convey congestion notifications. Thus, additional and separate congestion notifications are not required thereby minimising auxiliary network traffic. The same applies to the Xon flow control notifications.

Therefore, subsequently if a data packet destined for the egress port from which the Xoff flow control notification was sent to the ingress port arrives at the ingress port 10, then the data packet will be routed to the newly-established (or already existing) set-aside queue at the ingress port. If this is not the case, and the data packet is not destined for the congested egress port 12 then the packet is routed to a corresponding cold queue associated with the uncongested egress port 12. Of course, if post-processing is utilised all data packets are first routed to a cold queue and from there either onwards to a corresponding egress port or first to a particular set-aside queue.

Thus, it can be seen that the RECN functionality may be achieved whilst the memory requirements of the switch (and therefore the network as a whole) is significantly reduced. Clearly, this provides a significant advantage over known systems. Furthermore, as data rates increase across networks the reduced memory requirement of the switch enables the higher data rates to be accommodated without significantly increasing the costs and complexity of each individual switch. Memory size at the ingress ports can be substantially doubled without there being an overall increase in the memory hardware requirements for a particular switch, as the memory that would previously have been provided at the egress ports is no longer required for operation of the switch. In addition, such a reduction in memory enables switches with a higher number of ports to be provided, thus providing cost and power-consumption savings.

In the description above, a switch has been described in which substantially no memory for data packets is provided at the egress ports. In another example, the memory for set-aside queues and cold queues is provided at the egress ports 12 instead of at the ingress ports 10. However, some memory is required at the ingress port for the establishment of virtual output queues to identify the egress ports that are causing the congestion. Thus greater savings in terms of memory requirement are achieved when a no-egress buffer configuration is adopted.

In WO-A-2005/086435, de-allocation of set-aside queues requires the passage of tokens between connected ports and switches. In order for a set aside queue and a CAM line to be de-allocated, the corresponding egress port has to count all tokens sent upstream and then count all tokens received from the upstream direction, a token being returned from an upstream port when one of its set-aside queues is de-allocated. Only when all tokens sent upstream are received by a port could a CAM line and a set-aside queue at the port be de-allocated. Although it works well, this is an extremely complex mechanism and can lead to an excessive number of set-aside queues being maintained. As described herein, de-allocation of set aside queues is significantly simplified and ensures that an excessive number of set-aside queues are not maintained. As soon as a set-aside queue is no longer required it can be de-allocated.

Whenever the number of data packets in a set-aside queue at an ingress port 10 reaches below a certain threshold, Xon threshold, an external Xon flow control notification or packet is sent to the upstream switch. The flow control packet includes the turnpool and bit mask of the CAM line corresponding to the set-aside queue at the Xon threshold. The egress port 12 at the upstream switch matches the turnpool and bit mask against all of its valid CAM lines. If there is a match, the corresponding Xoff bit is reset. Thus, data transmission of packets mapped into the set-aside queue resumes between the egress port and the ingress port in question.

Next, the egress port broadcasts the Xon flow control packet to all the ingress ports of the downstream switch. Each of the ingress ports matches the provided turnpool and bit mask and, in the case of a match, will reset the corresponding Xon bit, thus enabling the ingress ports to resume transmission of data packets destined for the previously congested downstream location.

Whenever a set-aside queue at an ingress port empties, as long as one or more of a number of criteria are satisfied, the set-aside queue is de-allocated and a valid bit in the corresponding CAM line is reset. The criteria may include a determination that the corresponding Xoff bit for the set-aside queue is not set and/or that the timer has expired. An external notification is sent to the upstream switch. The notification includes the turnpool and bit mask of the CAM line. The egress port matches the turnpool and bit mask provided and if there is a match, the corresponding CAM line at the egress port is removed, i.e. the valid bit is reset.

In other words, the allocation of set-aside queues can happen independently of the state of congestion anywhere else on the network. There is no limitation on when a particular set-aside queue can de-allocate other than the requirement that the set-aside queue is empty or below a defined threshold. In particular, there is no particular order by which de-allocation must occur, i.e. leaf to root. The de-allocation is therefore referred to as "distributed de-allocation", and provides a simple, robust and reliable method by which unused (but otherwise assigned) memory can quickly be made available for use in the switch.

Embodiments of the present invention have been described with particular reference to the examples illustrated. However, it will be appreciated that variations and modifications may be made to the examples described within the scope of the present invention.

The invention claimed is:

1. A switch, comprising:
   a plurality of ingress ports and a plurality of egress ports, the switch being for connection in a network of other like switches;
   memory for storing data packets;
   a control system arranged to operate in accordance with Regional Explicit Congestion Notification, the control system being arranged in use to control the switch to, upon receipt at one of the ingress or egress ports of notification of congestion at a first downstream congested port, either store at said ingress port or egress port data packets received for said congested port or to communicate with an upstream port for storage at said upstream port of data packets destined for the congested port, and in dependence on the amount of stored data, to send a message to a further upstream port informing the further upstream port of the congestion at the first downstream congested port;
   wherein the memory for storing data packets is provided only at the ingress ports or only at the egress ports of the switch.

2. A switch according to claim 1, wherein the control system comprises a content addressable memory.

3. A switch according to claim 1, wherein there is provided a content addressable memory associated with each of the ingress ports and each of the egress ports of the switch.

4. A switch according to claim 1, wherein memory for data packets is provided only at the ingress ports of the switch.

5. A switch according to claim 1, wherein the control system is arranged, upon receipt at an egress port of notification of downstream congestion, to send a message to an ingress port requesting establishment at said ingress port of a set-aside queue for storage of data packets destined for the first downstream congested port.

6. A switch according to claim 1, wherein the control system is arranged, upon receipt at an ingress or egress port of notification of downstream congestion, to establish an entry in the content addressable memory associated with the respective ingress or egress port corresponding to the location of the downstream congestion at the first downstream congested port.

7. A switch according to claim 1, wherein when a request for storage is received at an ingress port, a set-aside queue is established for data packets to be received destined for the congestion if no such set-aside queue already exists.

8. A switch according to claim 1, wherein the control system is arranged, upon receipt at an ingress port of a data packet, to store the data packet in a queue for data packets destined for uncongested ports and subsequently to identify whether or not the packet is destined for a congested port and if it is to move the packet to a corresponding set-aside queue.

9. A switch according to claim 1, wherein the control system is arranged, upon receipt at an egress port of a data packet, to identify whether or not the data packet is destined for a congested port and if it is to send a notification to the ingress port in the switch that sent the said data packet to establish a set-aside queue for storage of data packets destined for the congested port.

10. A method of congestion management in a network of switches each switch having plural ingress ports and plural egress ports and a control system for controlling the switch, the method comprising:
   controlling operation of the switch in accordance with Regional Explicit Congestion Notification;
   upon receipt at one of the ingress or egress ports of a switch of notification of downstream congestion at a first congested port, either storing at said ingress port or egress port data packets received for said first congested port or communicating with an upstream ingress or egress port requesting storage at said upstream ingress or egress port of data packets destined for the first congested port and in dependence on the amount of data stored, sending to a further upstream port notification of the congestion downstream at the first congested port;

wherein the storage of data packets is in memory provided only at the ingress ports or the egress ports within a switch.

11. A method according to claim 10, comprising providing content addressable memory at the ingress and egress ports of the switch for use in identifying desired routing for a data packet received at the port.

12. A method according to claim 10, wherein a content addressable memory is provided at each of the ingress and egress ports of the switch.

13. A method according to claim 10, comprising, upon receipt at an egress port of notification of downstream congestion, sending a message to an ingress port requesting establishment at said ingress port of a set-aside queue for storage of data packets destined for the first congested port.

14. A method according to claim 11, comprising, upon receipt at an ingress or egress port of notification of downstream congestion, establishing an entry in the content addressable memory associated with the respective ingress or egress port corresponding to the location of the downstream congestion at the first congested port.

15. A method claim 10, comprising establishing a set-aside queue for data packets to be received destined for the first congested port if no such set-aside queue already exists when a request for storage is received at an ingress port.

16. A method claim 10, comprising, upon receipt at an ingress port of a data packet, storing the data packet in a queue for data packets destined for uncongested ports and subsequently identifying whether or not the packet is destined for a congested port and if it is moving the packet to a corresponding set-aside queue.

17. A method according to claim 16, comprising, upon receipt at an egress port of a data packet, identifying whether or not the data packet is destined for a congested port and if it is sending a notification to the ingress port in the switch that sent the said data packet to establish a set-aside queue for storage of data packets destined for the first congested port.

18. A network of interconnected switches at least some of the switches having plural ingress ports and plural egress ports, the switches being connected in such a manner to enable routing of data packets from one location on the network to another location on the network, wherein at least one of the switches having plural ingress and plural egress ports is a switch according to claim 1.

19. A method of de-allocating a set-aside queue in a switch according to claim 1, comprising, when certain criteria are met, de-allocating the set-aside queue independently of the status of set-aside queues anywhere else on the network.

20. A method according to claim 19, wherein the criteria include one or more of the following:
(a) whether or not a bit is set that determines whether or not transmission from the set-aside queue can occur;
(b) whether or not a timer associated with the set-aside queue has expired; and,
(c) whether or not the set-aside queue is empty.

* * * * *